United States Patent
Huang et al.

(10) Patent No.: US 10,615,878 B2
(45) Date of Patent: Apr. 7, 2020

(54) OPTICAL SIGNAL MODULATION

(71) Applicant: Hewlett Packard Enterprise Development LP, Houston, TX (US)

(72) Inventors: Tsung-Ching Huang, Palo Alto, CA (US); Ashkan Seyedi, Palo Alto, CA (US); Chin-Hui Chen, Palo Alto, CA (US); Cheng Li, Palo Alto, CA (US); Marco Fiorentino, Mountain View, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/068,713

(22) PCT Filed: Jan. 15, 2016

(86) PCT No.: PCT/US2016/013599
§ 371 (c)(1),
(2) Date: Jul. 9, 2018

(87) PCT Pub. No.: WO2017/123243
PCT Pub. Date: Jul. 20, 2017

(65) Prior Publication Data
US 2019/0020416 A1  Jan. 17, 2019

(51) Int. Cl.
*H04B 10/516* (2013.01)
*H04B 10/524* (2013.01)
*H04J 14/02* (2006.01)

(52) U.S. Cl.
CPC ............ *H04B 10/516* (2013.01); *H04J 14/02* (2013.01); *H04J 14/0256* (2013.01); *H04B 10/524* (2013.01)

(58) Field of Classification Search
None
See application file for complete search history.

(56) References Cited

U.S. PATENT DOCUMENTS

| 4,726,644 A | 2/1988 | Mathis |
| 5,317,440 A * | 5/1994 | Hsu ........................ H04J 14/02 14/2 |

(Continued)

FOREIGN PATENT DOCUMENTS

| JP | 2008-524655 A | 7/2008 |
| JP | 2008-544855 | 7/2008 |

(Continued)

OTHER PUBLICATIONS

Kamat et al., Unleash the System on Chip using FPGAs and Handel C, 2009, Springer Science + Business Media, p. 20-21 (Year: 2009).*

(Continued)

*Primary Examiner* — Jai M Lee
(74) *Attorney, Agent, or Firm* — Sheppard Mullin Richter & Hampton LLP

(57) ABSTRACT

An example system includes an optical modulator and a multiplexing controller. The modulator includes a data bus for receiving at least one data signal, a plurality of multiplexers and a plurality of modulating segments. Each multiplexer is coupled to the data bus to receive at least one data signal and to output a multiplexed signal. Each modulating segment may receive the multiplexed signal from one of the plurality of multiplexers and modulate the multiplexed signal using an optical input. The multiplexing controller may be in communication with the plurality of multiplexers and may configure each of the plurality of multiplexers in accordance with a selected modulation type.

20 Claims, 8 Drawing Sheets

(56) References Cited

U.S. PATENT DOCUMENTS

| | | | |
|---|---|---|---|
| 6,124,960 A * | 9/2000 | Garthe | H04B 10/25137 398/1 |
| 6,889,347 B1 * | 5/2005 | Adams | H04B 10/07953 398/147 |
| 6,909,386 B1 * | 6/2005 | Kim | H03M 5/02 341/111 |
| 7,380,993 B2 | 6/2008 | Dallesasse | |
| 7,515,778 B2 | 4/2009 | Mosinskis et al. | |
| 8,340,529 B2 * | 12/2012 | Shastri | G09G 5/006 398/141 |
| 8,380,017 B2 * | 2/2013 | Sugiyama | G02B 6/29352 385/2 |
| 8,620,115 B2 * | 12/2013 | Webster | G02F 1/2257 385/1 |
| 8,724,939 B2 * | 5/2014 | Shastri | G02F 1/0121 385/1 |
| 8,929,689 B2 * | 1/2015 | Metz | G02F 1/011 385/1 |
| 8,948,608 B1 | 2/2015 | Pobanz | |
| 9,819,525 B2 * | 11/2017 | Le Taillandier De Gabory | H04B 10/50575 |
| 10,084,619 B2 * | 9/2018 | Dupuis | H04L 25/03114 |
| 10,305,597 B2 * | 5/2019 | Kucharski | G02F 1/225 |
| 2003/0170035 A1 * | 9/2003 | Kisaka | H04J 14/08 398/183 |
| 2005/0019036 A1 * | 1/2005 | Soto | H04J 14/02 398/135 |
| 2006/0127103 A1 | 6/2006 | Mazurczyk et al. | |
| 2006/0129728 A1 * | 6/2006 | Hampel | G06F 13/1668 710/118 |
| 2006/0228116 A1 * | 10/2006 | Bontu | H04B 10/2572 398/152 |
| 2007/0212076 A1 * | 9/2007 | Roberts | G02F 1/0121 398/183 |
| 2007/0212079 A1 * | 9/2007 | Ooi | H04B 10/505 398/198 |
| 2007/0237444 A1 * | 10/2007 | Keil | B82Y 20/00 385/3 |
| 2008/0089634 A1 * | 4/2008 | Mosinskis | G02F 1/0121 385/3 |
| 2009/0074407 A1 * | 3/2009 | Hornbuckle | H04B 10/532 398/43 |
| 2010/0156679 A1 * | 6/2010 | Ehrlichman | G02F 1/0121 341/50 |
| 2010/0239264 A1 * | 9/2010 | Yang | H04B 10/505 398/98 |
| 2011/0044573 A1 * | 2/2011 | Webster | G02F 1/0121 385/3 |
| 2011/0229149 A1 | 9/2011 | Grubb et al. | |
| 2012/0230626 A1 * | 9/2012 | Metz | G02F 1/011 385/3 |
| 2012/0237160 A1 * | 9/2012 | Shastri | G02F 1/0121 385/14 |
| 2012/0251032 A1 * | 10/2012 | Kato | G02F 1/0327 385/3 |
| 2012/0315036 A1 | 12/2012 | Kucharski et al. | |
| 2013/0294546 A1 | 11/2013 | Emami-Neyestanak et al. | |
| 2014/0321864 A1 * | 10/2014 | Bliss | H04B 10/541 398/186 |
| 2015/0063822 A1 * | 3/2015 | Noguchi | G02F 1/0121 398/140 |
| 2015/0249501 A1 * | 9/2015 | Nagarajan | H04B 10/40 398/79 |
| 2016/0218811 A1 * | 7/2016 | Chen | H04B 10/5561 |
| 2017/0052394 A1 * | 2/2017 | Goodwill | G02F 1/011 |
| 2017/0141869 A1 * | 5/2017 | Welch | H04J 10/532 14/2 |
| 2019/0113680 A1 * | 4/2019 | Sodagar | G02B 6/1225 |
| 2019/0235345 A1 * | 8/2019 | Qi | G02F 1/21 |

FOREIGN PATENT DOCUMENTS

| | | |
|---|---|---|
| WO | WO-2006-105531 | 10/2006 |
| WO | WO-2006-105531 A1 | 10/2006 |

OTHER PUBLICATIONS

Wu, X. et al., "A 20Gb/s NRZ/PAM-4 1V transmitter in 40nm CMOS driving a Si-photonic modulator in 0.13μm CMOS," Feb. 17-21, 2013, 3 pages.

Wu, X. et al., "High Performance Optical Transmitter for Next Generation Supercomputing and Data Communication," 2013; 184 pages.

International Search Report and Written Opinion received for PCT Patent Application No. PCT/US2016/013599, dated Sep. 12, 2016, 11 pages.

* cited by examiner

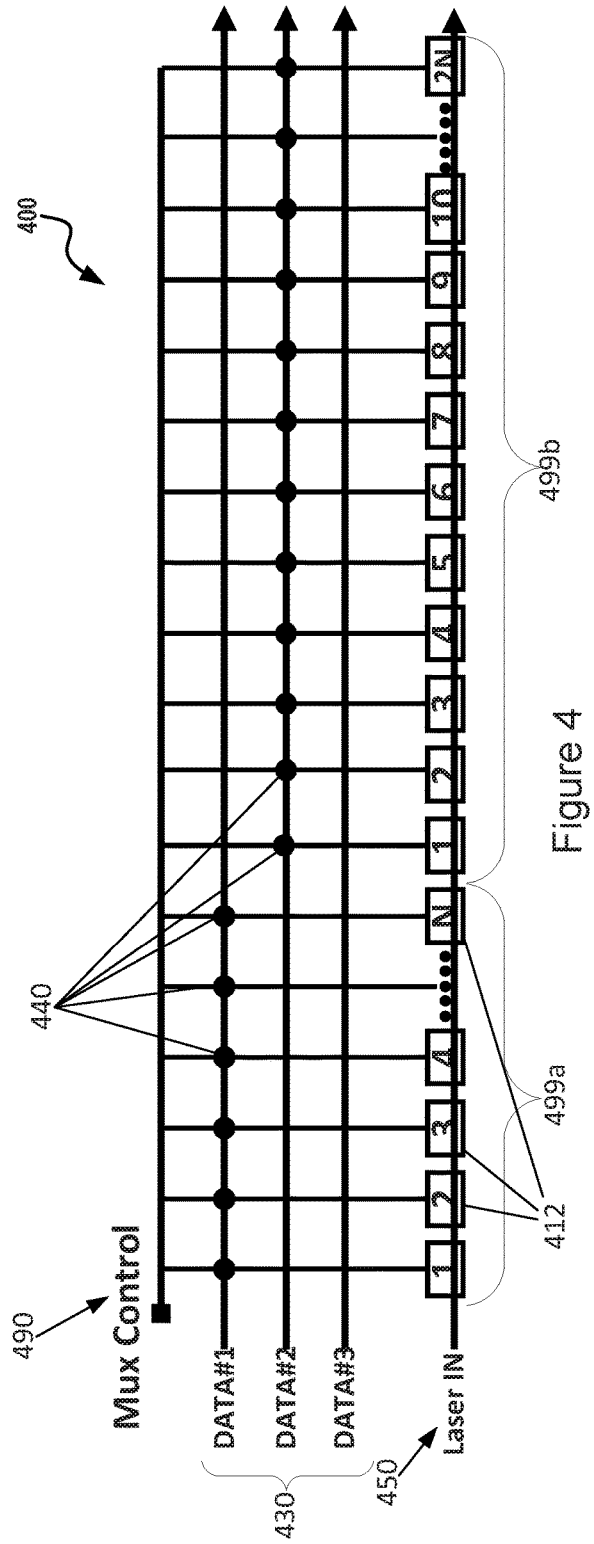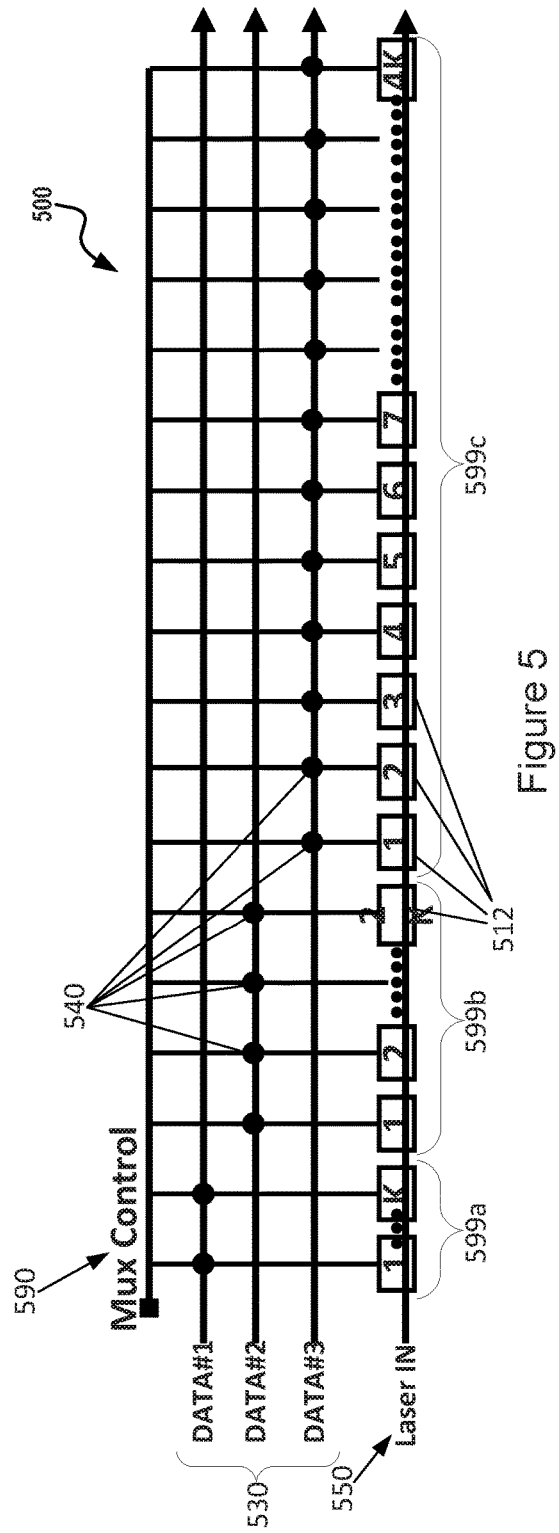

OPTICAL SIGNAL MODULATION

GOVERNMENT CONTRACT

This invention was made with government support under H98230-14-3-0011 awarded by MARYLAND PROCUREMENT OFFICE. The government has certain rights in the invention.

BACKGROUND

Transmitting information via an optical domain has become the mainstay of today's data communications primarily due to a potentially large bandwidth. Accessing this wide bandwidth places demands on the devices and components used in such communications. For example, wide bandwidth may require high-speed designs and an increased power demands. Some optical communications schemes rely on advanced modulation formats.

BRIEF DESCRIPTION OF THE DRAWINGS

For a more complete understanding of various examples, reference is now made to the following description taken in connection with the accompanying drawings in which:

FIG. 4 illustrates an example of optical modulation using 4-level pulse-amplitude modulation (PAM-4);

FIG. 5 illustrates an example of optical modulation using 8-level pulse-amplitude modulation (PAM-8);

DETAILED DESCRIPTION

Various examples described herein provide systems for optical modulation which may be highly configurable. In one example, the electrical driver for a Mach-Zehnder Modulator (MZM) segmented into a plurality of smaller, equally sized sub-driver units, each of which is independently controlled using an associated multiplexer, which may be referred to herein as modulating segments. The multiplexer selects a data input for the associated driver and the MZM segment. Each multiplexer is controlled by a multiplexer controller, thus allowing the multiplexers to be configured in accordance with a desired modulation type, such as non-return-to-zero (NRZ), 4-level pulse-amplitude modulation (PAM-4), or 8-level pulse-amplitude modulation (PAM-8), for example.

Figure 1:
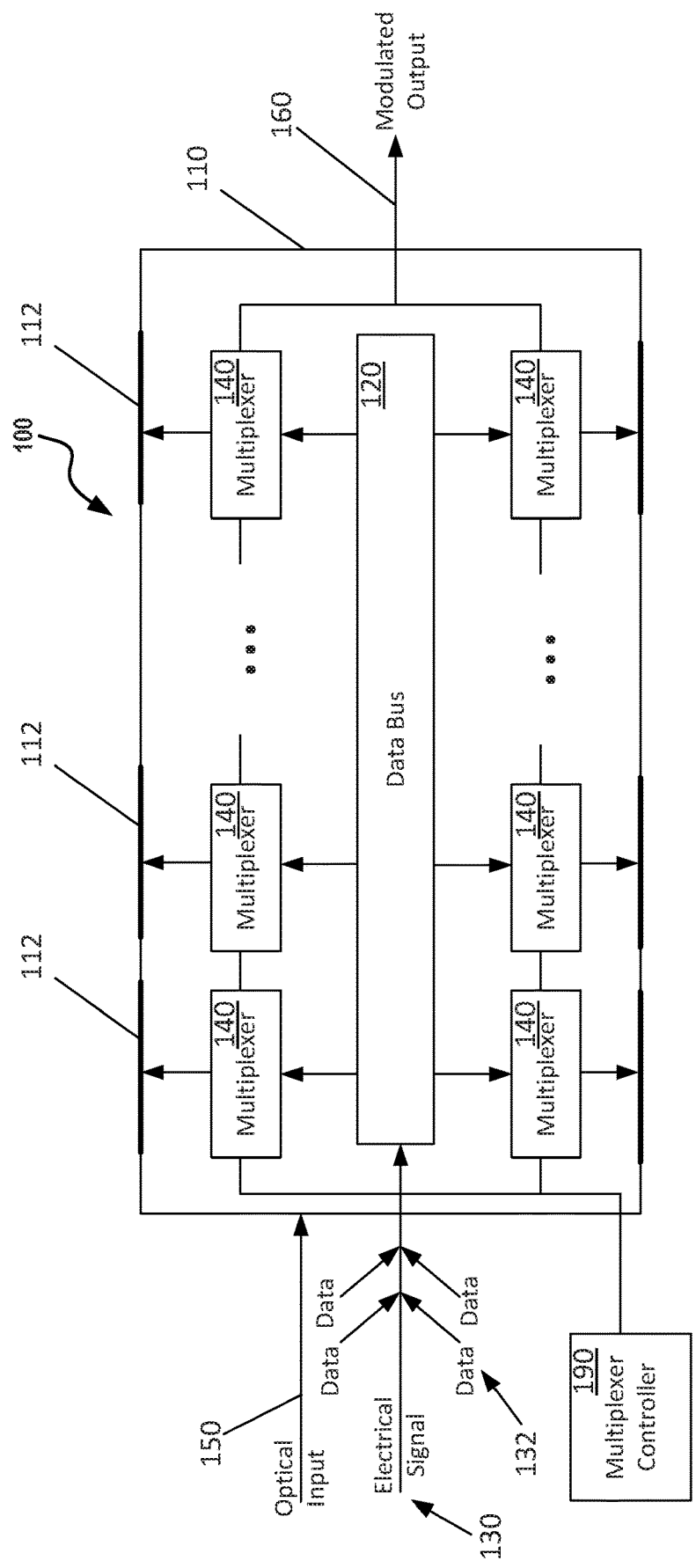
FIG. 1 illustrates an example system for optical modulation.

Referring now to the figures, FIG. 1 illustrates an example system for optical modulation. The example system 100 includes an optical modulator 110, which may be an NUM. The example optical modulator 110 is divided into at least two modulating segments 112. In various examples, the modulating segments 112 are of equal size to each other. In some examples, the modulating segments 112 are not of equal size to each other, and the drive voltage is varied to compensate for the varying size of the modulating segments 112.

A data bus 120 is provided to carry data signals 132 through the example system 100. The data signals 132 may be received by the data bus 120 as an electrical signal 130 which includes multiple data signals 132. The data signals 132 may include information to be carried from, for example, one node of a computing system to another node.

Each modulating segment 112 of the example optical modulator 110 is provided with an associated multiplexer 140. Each multiplexer 140 is configured to select zero, one or more data signals from the data bus 120 and to direct the selected signal(s) to the associated modulating segment 112.

An optical input 150 is directed into the example optical modulator 110. In various example, the optical input 150 may include one or more laser inputs. As described in greater detail below with reference to FIGS. 3-5, the optical modulator 110 uses the multiplexed signals from the multiplexers 140 and the optical input 150 to generate a modulated output 160.

By providing multiple multiplexers 140, the example system 100 allows flexibility in the type of modulation used by the example system 100. Each multiplexer 140 may be individually configured to provide a select data signal 132 to each modulating segment 112, suitable for the desired modulation type. In this regard, the example system 100 includes a multiplexing controller 190 in communication with each multiplexer 140. The multiplexing controller 190 may be implemented as hardware or software that is configurable or re-configurable in the field. For example, the multiplexing controller 190 may be used to configure each multiplexer to provide non-return-to-zero (NRZ) or pulse-amplitude modulation (PAM).

Figure 2:
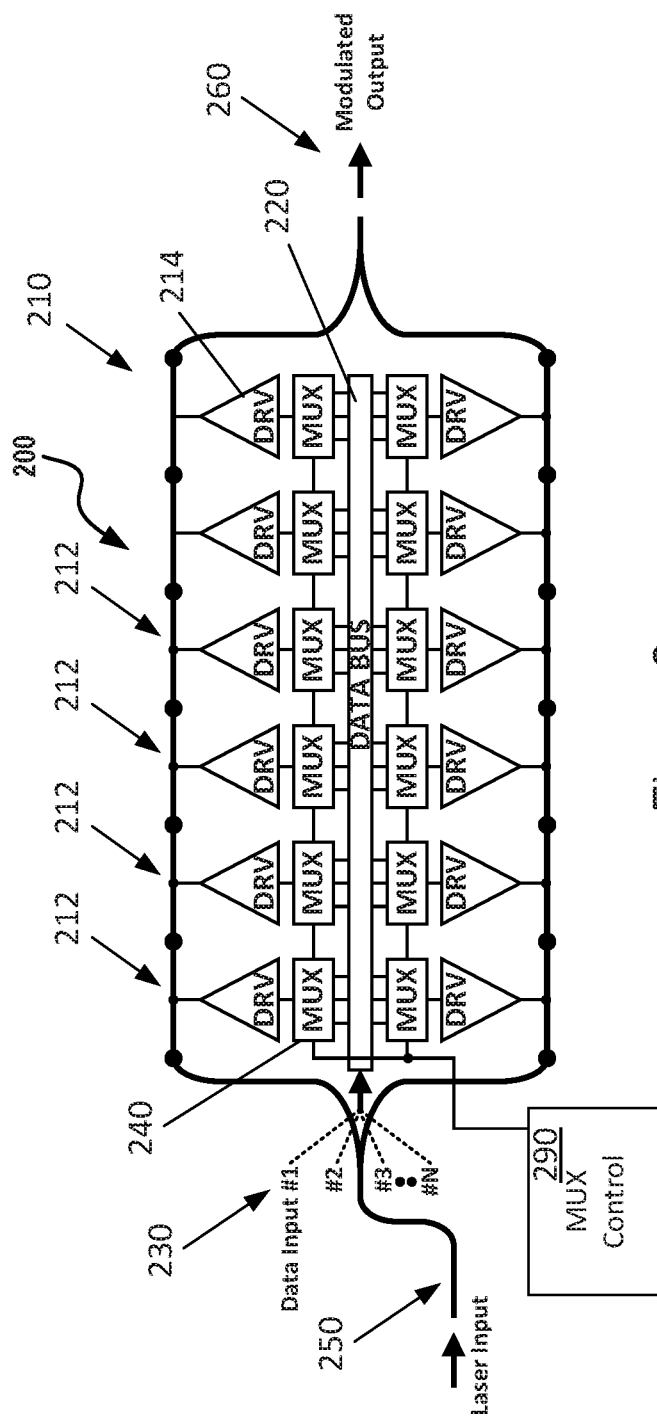
FIG. 2 illustrates another example system for optical modulation.

Referring now to FIG. 2, another example system for optical modulation is schematically illustrated. The example system 200 of FIG. 2 includes an optical modulator 210 which may be an MZM. The example optical modulator 210 is segmented into multiple equally-sized modulating segments 212. Each modulating segment 212 has an associated driver 214 to amplify a data signal to drive the modulating segment 212.

A data bus 220 is provided to carry data signals 230 through the example system 200. The data signals 230 may be received by the data bus 220 as electrical signals which include multiple data signals. In one example, the optical modulator 210 is a push-pull MZM that is driven by differential CMOS drivers and a tunable delay included in the data bus 220. The example system 200 is provided with at least two multiplexers 240. Each multiplexer 240 may receive at least one data signal from the plurality of data signals 230 carried by the data bus 220. Each multiplexer 240 outputs a multiplexed signal to an associated driver 214 of a modulation segment 212. Thus, each modulating segment 212 includes an associated driver 214 and an associated multiplexer 240. Each multiplexer 240 selects one or more data signals from the data bus 2220 and outputs a multiplexed signal to the associated driver 214 for driving the associated modulating segment 212.

An optical signal 250, such as at least one laser input, is directed into the example optical modulator 210. The optical modulator 210 may use the optical signal and the data signals 230 to output a modulated output 260 in accordance with a selected modulation type.

The example system 200 is provided with a multiplexing controller 290 in communication with the plurality of multiplexers 240. The multiplexing controller 290 may be used to control the multiplexers 240 in accordance with a selected modulation type of the modulated output signal 260. The multiplexing controller 290 may be used to configure each multiplexer 240 to select a data signal from the data signals 230 and to provide the selected data signal to the associated driver 214 of each modulating segment 212. The data signal selected by each multiplexer 240 may be configured for a desired modulation type, such as NRZ or PAM.

Figure 3:
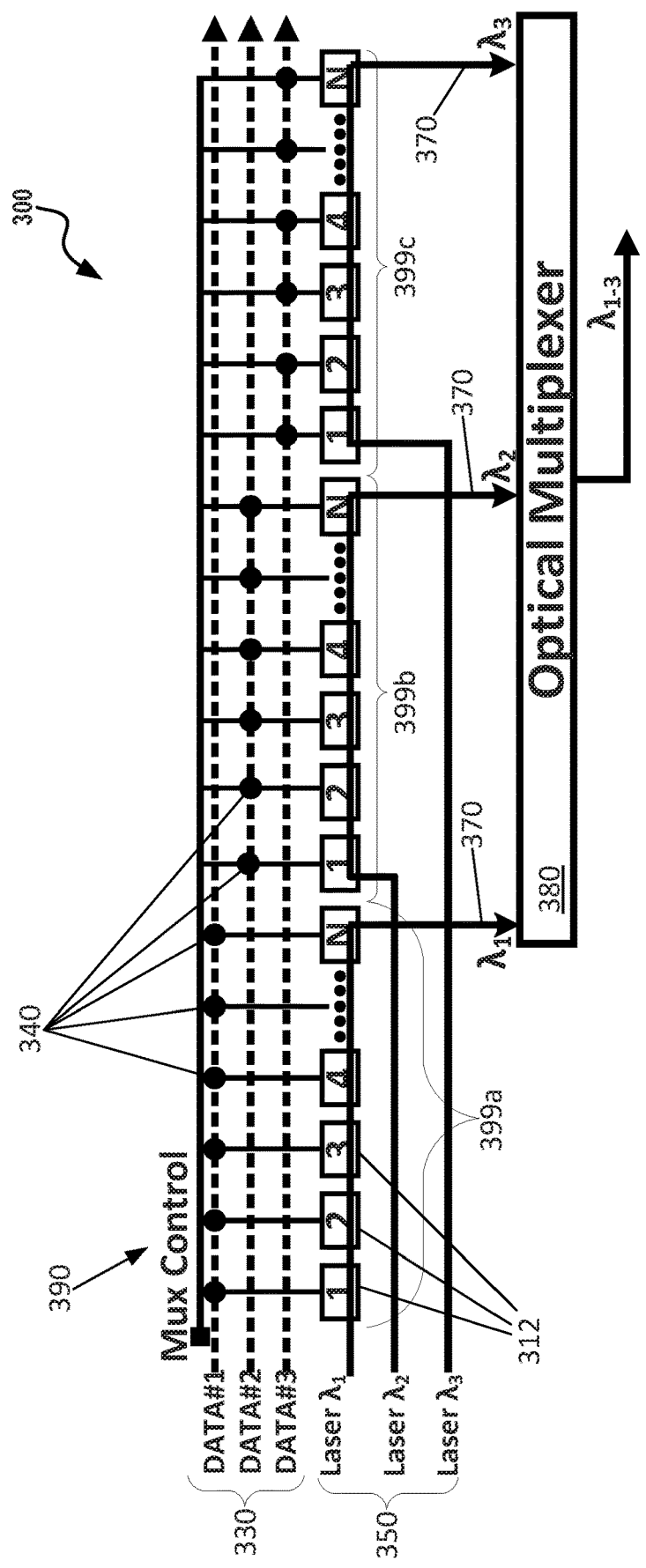
FIG. 3 illustrates an example of optical modulation using non-return-to-zero (NRZ) modulation for wavelength-division multiplexing (WDM)

Referring now to FIG. 3, an example of optical modulation using wavelength-division multiplexing (WDM) architecture with an example system 300 is illustrated. The example system 300 is illustrated with multiple modulating segments 312, multiple multiplexers 340 and a multiplexing controller 390. The example of FIG. 3 is illustrated with three independent data channels 330 and an optical input 350 with three wavelengths ($\lambda 1$, $\lambda 2$ and $\lambda 3$).

The multiplexing controller 390 configures each multiplexer 340 to select a data signal from the data channels 330. Each multiplexer 340 directs the multiplexed data signal to the associated modulating segment 312. In the example of FIG. 3, each multiplexer 340 is configured for NRZ modulation for three wavelengths.

Thus, in the example of FIG. 3, a first bank 399*a* of modulating segments 312 receives data signals from the first data channel and modulates the data signals with the optical signal of the first wavelength $\lambda 1$. Similarly, a second bank 399*b* of modulating segments 312 receives data signals from the second data channel and modulates the data signals with the optical signal of the second wavelength $\lambda 2$, and a third bank 399*c* of modulating segments 312 receives data signals from the third data channel and modulates the data signals with the optical signal of the third wavelength $\lambda 3$. For NRZ modulation, each bank 399*a-c* of modulating segments includes the same number of modulating segments 312.

For the example of NRZ modulation of FIG. 3, each bank 399*a-c* of modulating segments outputs a modulated optical signal 370 for the associated wavelength. The three modulated optical signals 370 may be directed to an optical multiplexer 380 to output a single modulated output 360.

Referring now to FIG. 4, an example of optical modulation using 4-level pulse-amplitude modulation (PAM-4) with an example system 400 is illustrated. The example system 400 may be similar to the example system 300 described above with reference to FIG. 3 and is illustrated with multiple modulating segments 412, multiple multiplexers 440 and a multiplexing controller 490. The example of FIG. 4 is illustrated with three independent data channels 430 and an optical input 450 including a single laser.

The multiplexing controller 490 configures each multiplexer 440 to select a data signal from the data channels 430. Each multiplexer 440 directs the multiplexed data signal to the associated modulating segment 412. In the example of FIG. 4, each multiplexer 440 is configured for PAM-4 modulation.

Thus, in the example of FIG. 4, a first bank 499*a* of modulating segments 412 receives data signals from the first data channel and modulates the data signals with the optical input 450. Similarly, a second bank 499*b* of modulating segments 412 receives data signals from the second data channel and modulates the data signals with the optical input 450. For PAM-4, in one example, the optical modulator (e.g., MZM) may be divided into six modulating segments 412. The first bank 499*a* may include two modulating segments driven by one data input (e.g., a least-significant-bit (LSB)), and the second bank 499*b* may include four modulating segments driven by another data input (e.g., most-significant-bit (MSB)). With the second bank 499*b* (MSB) driving double the length of the optical modulator than the first bank 499*a* (LSB), an optical phase shift associated with the second bank 499*b* is two times that of the first bank 499*a*.

Referring now to FIG. 5 an example of optical modulation using 8-level pulse-amplitude modulation (PAM-8) with an example system 500 is illustrated. The example system 500 may be similar to the example system 300 described above with reference to FIG. 3 and the example system 400 describe above with reference to FIG. 4. The example system 500 of FIG. 5 is illustrated with multiple modulating segments 512, multiple multiplexers 540 and a multiplexing controller 590. The example of FIG. 5 is illustrated with three independent data channels 530 and an optical input 550 including a single laser.

Again, the multiplexing controller 590 configures each multiplexer 540 to select a data signal from the data channels 530. Each multiplexer 540 directs the multiplexed data signal to the associated modulating segment 512. In the example of FIG. 5, each multiplexer 540 is configured for PAM-8 modulation.

Thus, in the example of FIG. 5, a first bank 599*a* of modulating segments 512 receives data signals from the first data channel and modulates the data signals with the optical input 550. Similarly, a second bank 599*b* of modulating segments 512 receives data signals from the second data channel and modulates the data signals with the optical input 550, and a third bank 599*c* of modulating segments 512 receives data signals from the third data channel and modulates the data signals with the optical input 550. For PAM-8, in one example, the first bank 599*a* may include k modulating segments driven by one data input, the second bank 599*b* may include 2 k modulating segments driven by a second data input, and the third bank 599*c* may include 4 k modulating segments driven by a third data input.

Figure 6:
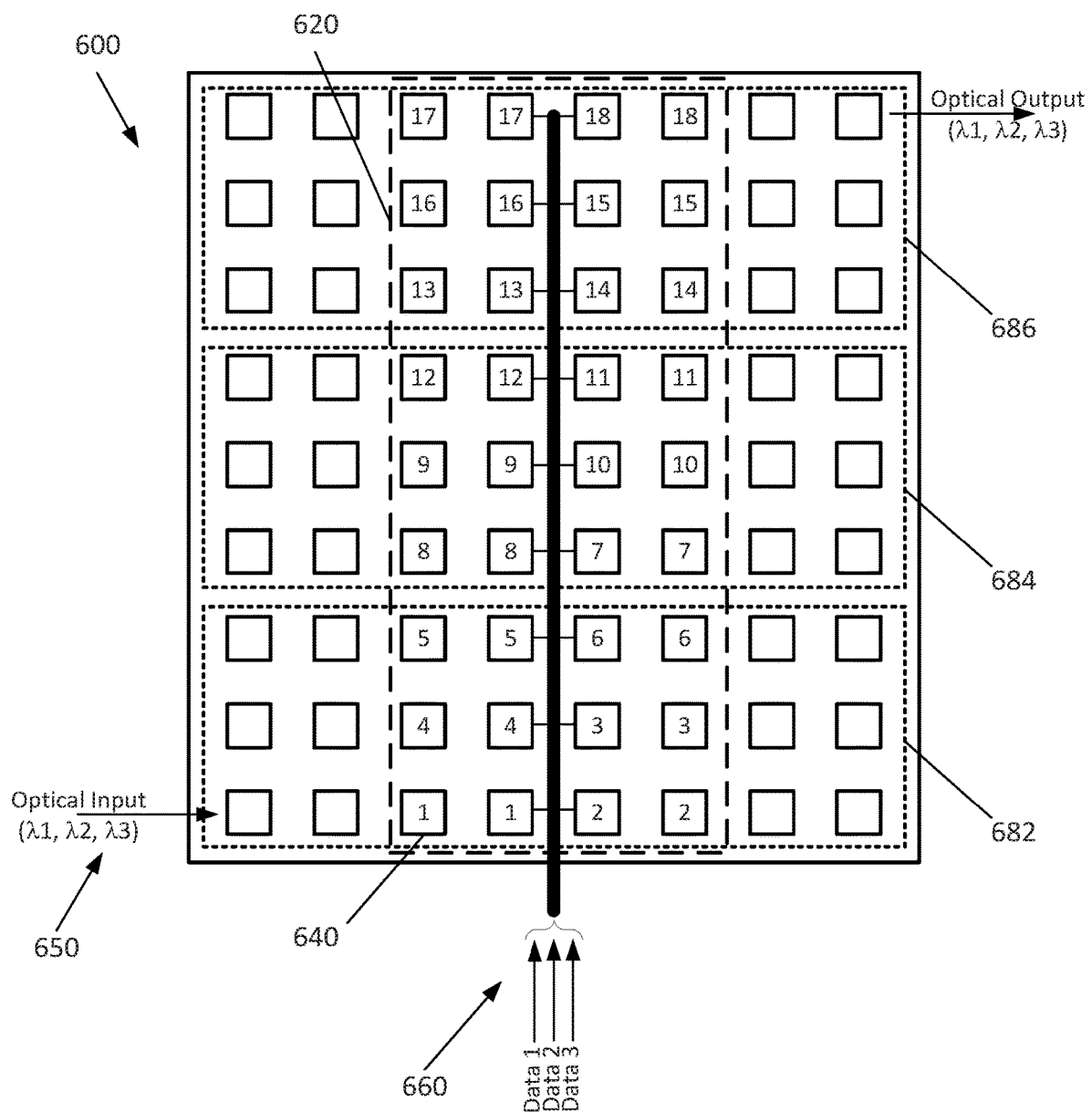
FIG. 6 illustrates an example chip in an NRZ modulation configuration.
Figure 7:
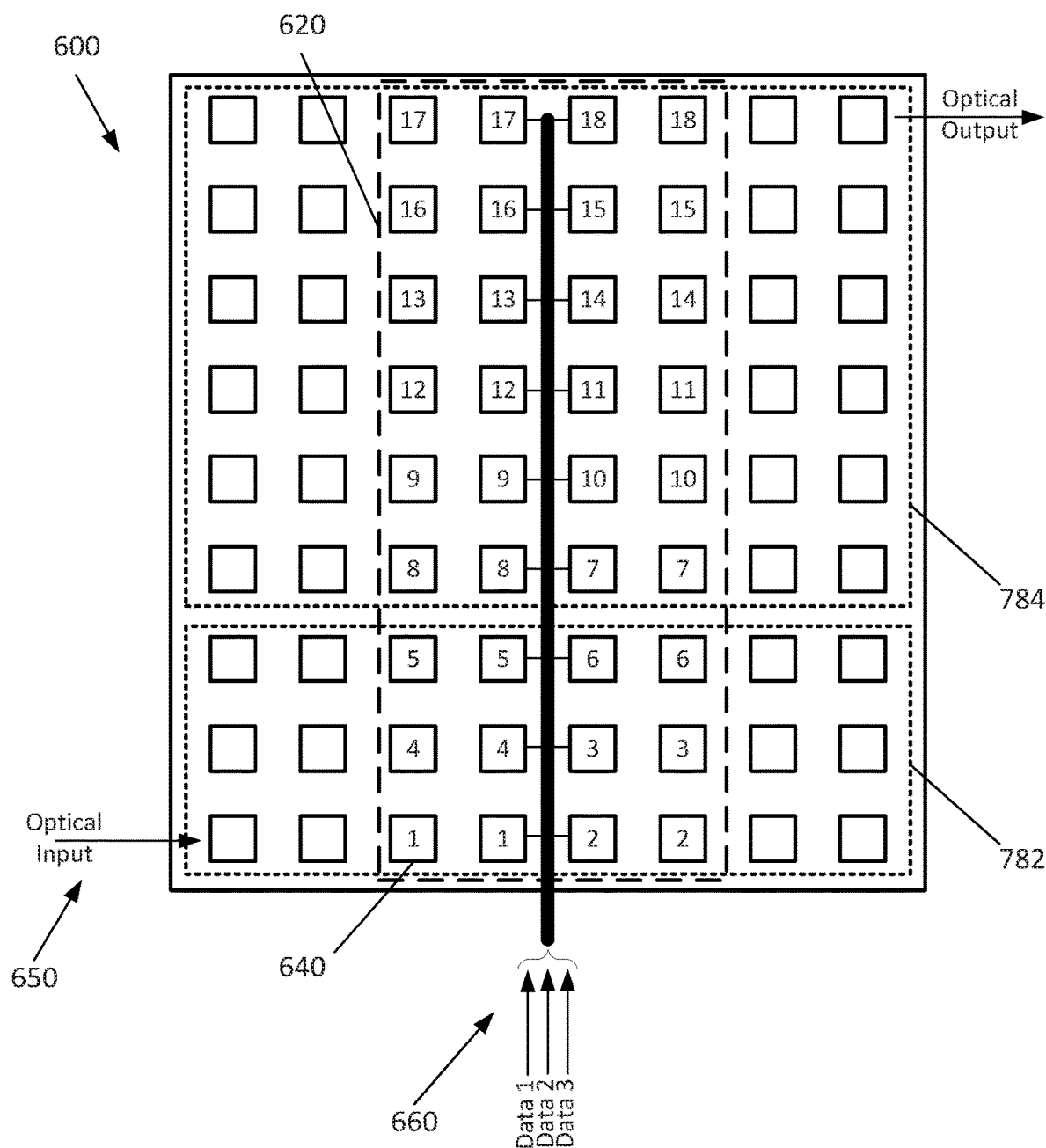
FIG. 7 illustrates the example chip of FIG. 6 in a PAM-4 configuration.
Figure 8:
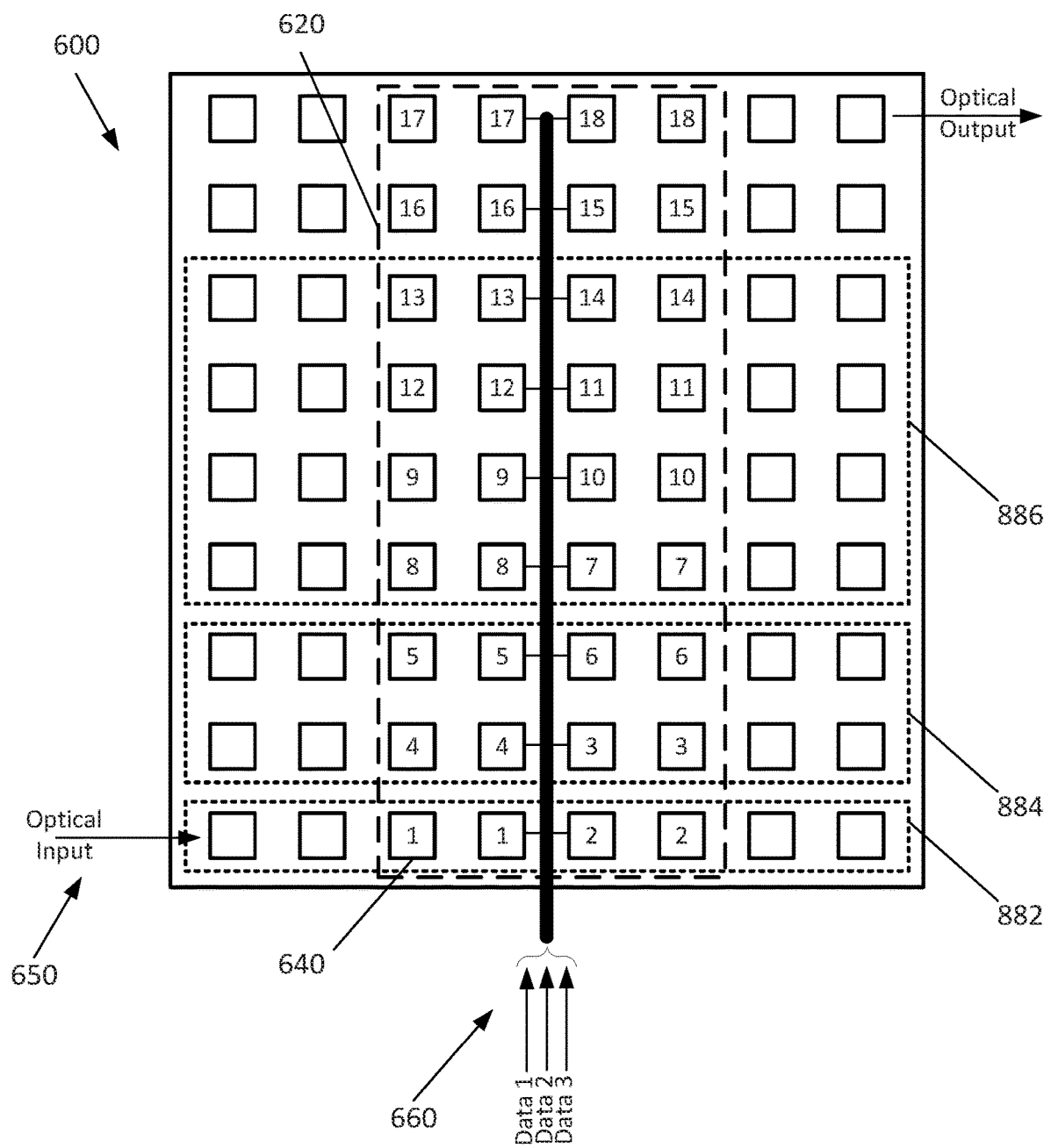
FIG. 8 illustrates the example chip of FIG. 6 in a PAM-8 configuration.

Referring now to FIGS. 6-8, an example chip 600 including an example optical modulator is illustrated in various configurations. In various examples, the example chip 600 may be formed as, for example, a flip-chip configuration. In this regard, the chip may form an electrical-optical interface. The example chip 600 includes various pads 610 and CMOS circuitry 620 which may include various components such as, for example, tunable delay cells, multiplexers, pre-drivers and post-drivers. The example chip 600 is provided with multiple modulating segments 640 (e.g., MZM segments). In the example illustrated in FIGS. 6-8, the example chip 600 is provided with 18 modulating segments 640. The example chip 600 is provided with an optical input 650 and data inputs 660.

Referring first to FIG. 6, the example chip 600 is illustrated in an NRZ modulation configuration. In this configuration, the optical input 650 includes light (e.g., laser) at three different wavelengths ($\lambda 1$, $\lambda 2$ and $\lambda 3$). The modulating segments 640 are divided into three banks 682, 684, 686. In the example of FIG. 6, six modulating segments 640, each of which may include a driver, are used to modulate each data input 660. A multiplexer associated with each modulating segment 640 may direct the appropriate data input to the modulating segment 640. The output of the optical modulation includes three modulated signals, each corresponding to a different wavelength ($\lambda 1$, $\lambda 2$ and $\lambda 3$). In this regard, an optical multiplexer 690 may be provided for the NRZ modulation configuration to output a single optical signal.

Referring next to FIG. 7, the example chip 600 of FIG. 6 is illustrated in a PAM-4 configuration. For PAM-4 mode, the modulating segments 640 are divided into two banks 782, 784. The first bank 782 has N modulating segments, and the second bank 784 has 2N modulating segments. In the illustrated example of FIG. 7, N is 6. Thus, first bank 782 includes six modulating segments 640, and the second bank 784 includes 12 modulating segments 640. The first bank 782 is connected to a first data signal of the data input 660, and the second bank 782 is connected to a second data signal of the data input 660. A multiplexer associated with each modulating segment 640 may direct the appropriate data input to the modulating segment 640.

Referring now to FIG. 8, the example chip 600 of FIGS. 6 and 7 is illustrated in a PAM-8 configuration. For PAM-8 mode, the modulating segments 640 are divided into three banks 882, 884, 886. The first bank 882 has N modulating segments, the second bank 884 has 2N modulating segments, and the third bank 886 has 4N modulating segments. In the illustrated example of FIG. 8, N is 2. Thus, first bank 882 includes two modulating segments 640, the second bank 884 includes four modulating segments 640, and the third bank 886 includes eight modulating segments 640. Eight-level optical signals can thus be generated similar to the case of PAM-4 described above with reference to FIG. 7. In the case of FIG. 8, four out of 18 modulating segments 640 are tied to ground without modulation.

The first bank 882 is connected to a first data signal of the data input 660, the second bank 884 is connected to a second data signal of the data input 660, and the third bank 886 is connected to a third data signal of the data input 660. A multiplexer associated with each modulating segment 640 may direct the appropriate data input to the modulating segment 640.

Thus, as illustrated by the examples of FIGS. 6-8, the same chip 600 can be used for various types of optical modulation simply by configuration of the multiplexers. Such an arrangement can provide tremendous flexibility and cost savings by avoiding the need to replace entire systems for changes in modulation types.

Figure 9:
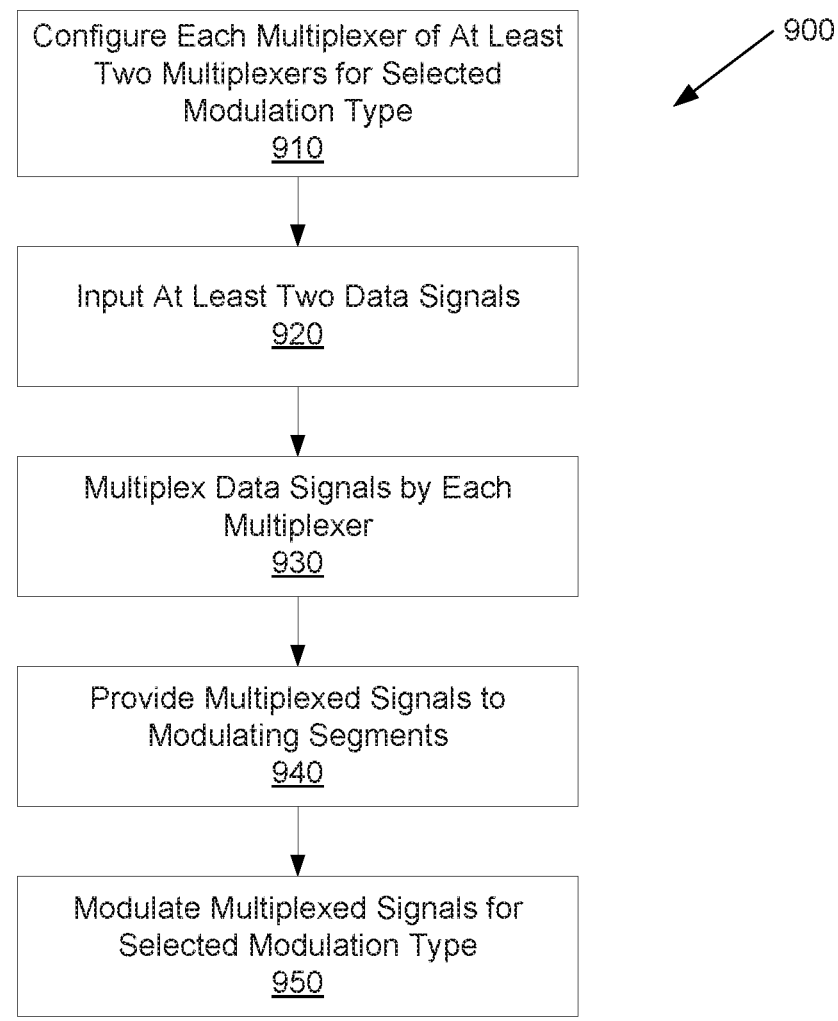
FIG. 9 is a flow chart illustrating an example process for selectively configuring multiplexers for a selected modulation type.

Referring now to FIG. 9, a flow chart illustrating an example process for selectively configuring multiplexers for a selected modulation type is provided. The example process 900 is described with reference to the example system 100 of FIG. 1 but may be applicable, with or without modification, to various other systems. In accordance with the example process, each multiplexer 140 of at least two multiplexers 140 is configured for a selected modulation type (block 910). In this regard, each multiplexer 140 may be configured to select an appropriate data signal for a corresponding modulating segment 112, for example. As described above with reference to FIGS. 3-5 and 6-8, the multiplexers 140 may be configured for NRZ modulation or PAM-n, where n is a power of 2, for example.

An electrical signal including at least two data signals may be input into the example optical modulator 110 (block 920). As described above, the data signals may be carried by a data bus 120. Based on the configuration of the multiplexers 140 in block 910, each multiplexer 140 may multiplex (e.g., select) a particular data signal from the data bus (block 930) and provide the multiplexed signal to a corresponding modulating segment 112 (block 940). The optical modulator 110, or each modulating segment 112 of the optical modulator 110, may then modulate the multiplexed signals from the multiplexers 140 for the selected modulation type (block 950).

Thus, in accordance with various examples described herein, a practical and viable solution to realize a highly versatile and field-programmable CMOS driver for MZM may be provided. Various examples allow cost-effective configuration of an optical modulator in the field, eliminating the need to replace entire modulation systems.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
an optical modulator, the modulator comprising:
a data bus for receiving at least one data signal;
a plurality of multiplexers, each multiplexer coupled to the data bus to receive the at least one data signal and to output a multiplexed signal; and
a plurality of modulating segments, each modulating segment to receive the multiplexed signal from one of the plurality of multiplexers and modulate the multiplexed signal using an optical input, wherein each modulating segment is associated with one of the plurality of multiplexers; and
a multiplexing controller in communication with the plurality of multiplexers, the multiplexing controller to configure each of the plurality of multiplexers in accordance with a selected modulation type, wherein the multiplexing controller configures each multiplexer to select at least one data signal from the data bus and to direct the selected signal to the associated modulating segment based on the selected modulation type.

2. The device of claim 1, wherein the optical modulator is a Mach-Zehnder Modulator (MZM).

3. The device of claim 1, wherein the selected modulation type is non-return-to-zero (NRZ) modulation.

4. The device of claim 1, wherein the selected modulation type is pulse-amplitude modulation (PAM).

5. The device of claim 1, wherein the multiplexing controller is field-programmable to configure each multiplexer for the selected modulation.

6. A system, comprising:
an optical modulator having at least two modulation segments, each modulation segment having an associated multiplexer and driver to drive the modulation segment;
at least two multiplexers, each multiplexer to receive at least one data signal of a plurality of data signals and to output a multiplexed signal to an associated driver of a modulation segment of the at least two modulation segments, wherein the optical modulator is to use the multiplexed signal from each of the at least two multiplexers to produce a modulated output signal; and a multiplexing controller in communication with the plurality of multiplexers, the multiplexing controller configured to control the multiplexers in accordance with a modulation type of the modulated output signal, wherein the multiplexing controller configures each of the multiplexers to select at least one data signal from a data bus and to direct the selected signal to the associated modulating segment based on the modulation type.

7. The system of claim 6, wherein the optical modulator is a Mach-Zehnder Modulator (MZM).

8. The system of claim 6, wherein the modulation type is non-return-to-zero (NRZ) modulation.

9. The system of claim 6, wherein the modulation type is pulse-amplitude modulation (PAM).

10. The system of claim 6, wherein the multiplexing controller is field-programmable to configure each multiplexer for the modulation type.

11. A method, comprising:
configuring each multiplexer of at least two multiplexers in accordance with a selected modulation type, each multiplexer being in communication with a data bus;
inputting at least two data signals into the data bus;
multiplexing the data signals by each of the at least two multiplexers, wherein the at least two data signals are selected based on the selected modulation type;
providing multiplexed signals from each of the at least two multiplexers to a different modulating segment of an optical modulator, wherein the different modulating segment is selected based on the selected modulation type and an associated multiplexer; and
modulating the multiplexed signals to generate a modulated output in accordance with the selected modulation type.

12. The method of claim 11, wherein the optical modulator is a Mach-Zehnder Modulator (MZM).

13. The method of claim 11, wherein the selected modulation type is non-return-to-zero (NRZ) modulation.

14. The method of claim 11, wherein the selected modulation type is pulse-amplitude modulation (PAM).

15. The method of claim 14, wherein the selected modulation type is PAM-n, where n is a power of 2.

16. The method of claim 11, wherein the at least two data signal comprises three independent data streams and each data stream is associated with a bank of modulator segments.

17. The device of claim 1, wherein each of the modulator segments are associated with a particular wavelength of the optical input.

18. The device of claim 1, where the multiplexing controller configures each multiplexer of the plurality of multiplexers to select zero, one or more data signals from the data bus.

19. The system of claim 6, further comprising an optical multiplexer;
the optical multiplexer to receive the modulated output signal, wherein the modulated output signal comprises a plurality of modulated optical signals, each modulated optical signal associated with a different wavelength.

20. The system of claim 6, wherein each modulation segment of the at least two modulation segments having an associated optical input and data input.

* * * * *